US007016709B2

(12) United States Patent
Kortum et al.

(10) Patent No.: US 7,016,709 B2
(45) Date of Patent: Mar. 21, 2006

(54) UNIVERSAL MOBILE PHONE ADAPTER METHOD AND SYSTEM FOR VEHICLES

(75) Inventors: Philip T. Kortum, Austin, TX (US); Marc A. Sullivan, Austin, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 232 days.

(21) Appl. No.: 10/799,164

(22) Filed: Mar. 12, 2004

(65) Prior Publication Data

US 2005/0202854 A1 Sep. 15, 2005

(51) Int. Cl.
*H04Q 7/20* (2006.01)

(52) U.S. Cl. ................................ 455/569.1; 455/569.2; 455/557

(58) Field of Classification Search ................ 455/571, 455/573, 569.1, 556.1, 557, 569.2
See application file for complete search history.

(56) References Cited

U.S. PATENT DOCUMENTS

| | | | | |
|---|---|---|---|---|
| 5,479,479 | A * | 12/1995 | Braitberg et al. | 455/404.1 |
| 5,535,274 | A | 7/1996 | Braitberg et al. | |
| 5,779,205 | A * | 7/1998 | Ching | 248/205.8 |
| 5,822,427 | A * | 10/1998 | Braitberg et al. | 379/454 |
| 5,974,334 | A * | 10/1999 | Jones, Jr. | 455/556.2 |
| 6,246,766 | B1 * | 6/2001 | Walsh | 379/455 |
| 6,304,764 | B1 | 10/2001 | Pan | |
| 6,341,218 | B1 * | 1/2002 | Poplawsky et al. | 455/569.1 |
| 6,411,823 | B1 * | 6/2002 | Chen | 455/559 |
| 2002/0082058 | A1 | 6/2002 | Baratono et al. | |
| 2002/0086716 | A1 | 7/2002 | Pan | |
| 2002/0197954 | A1 | 12/2002 | Schmitt et al. | |
| 2003/0013501 | A1 | 1/2003 | Malhotra | |
| 2003/0013504 | A1 | 1/2003 | Park et al. | |
| 2003/0032459 | A1 | 2/2003 | Kim | |
| 2003/0109290 | A1 | 6/2003 | Moffi et al. | |

* cited by examiner

*Primary Examiner*—CongVan Tran
(74) *Attorney, Agent, or Firm*—Brooks Kushman P.C.

(57) ABSTRACT

A universal mobile phone adapter device for a vehicle appliance operable for enabling a user to talk hands-free on a mobile phone during a phone call between the mobile phone and a telephone of another party when the mobile phone is electronically connected to the vehicle appliance. The adapter device includes a universal vehicle adapter base integrated in the interior of the vehicle. The adapter base is electronically connected to the vehicle appliance. The adapter device includes first and second adapter sleeves which are removably receivable one at a time within the adapter base. The adapter sleeves include respective first and second mobile phone receiving areas for removably receiving first and second mobile phones having different configurations. The adapter sleeves and the adapter base electronically connect the mobile phones to the vehicle appliance when the adapter sleeves receive the respective mobile phones and the adapter base receives the adapter sleeves.

20 Claims, 2 Drawing Sheets

UNIVERSAL MOBILE PHONE ADAPTER METHOD AND SYSTEM FOR VEHICLES

BACKGROUND OF THE INVENTION

1. Field of the Invention

The present invention relates generally to a universal mobile phone adapter method and system for vehicles.

2. Background Art

It is desirable for mobile phone users to conduct telephone calls in their vehicles using hands-fee devices. Currently, mobile phone users have a few options for using hands-free devices in order to make telephone calls from their vehicles. One option is for the users to use vehicles having fully integrated cell phones such as provided by the OnStar® hands-free system. Another option is for the users to install mobile phone specific hands-free kits in their vehicles. Another option is for the users to use cigarette lighter adapter kits in their vehicles.

Each of these options have disadvantages. For example, the built-in cell phone system (i.e, the OnStar® hands-free system) precludes the use of the users' own mobile phone providers and mobile phones. As such, users are required to pay substantially higher rates for air time. Further, this built-in system cannot be removed from vehicles. Accordingly, the built-in cell phone is mobile only as long as a user is in a vehicle having the built-in system.

The mobile phone specific hands-free kits allow users to pick their own mobile phone providers and allow the users to remove their mobile phones from the vehicles. However, these kits are generally expensive to install in vehicles and mar the interior of the vehicles. Further, these kits only function with compatible mobile phones. For example, these kits only function with the mobile phones of a certain mobile phone provider. Furthermore, the hands-free capabilities of the mobile phones are only available in the vehicle in which the compatible mobile phone specific hands-free kit is installed.

The cigarette lighter adapter kits have the advantage of portability. However, the insertion and removal of a mobile phone is somewhat difficult and the quality of the reception and transmission can be quite poor due to the poor integration with the vehicle. Dialing capabilities are not provided and the microphones of the kits are, by necessity, in mounts which are frequently far from the users when the users are in the vehicles.

Thus, there exists a need for a universal mobile phone adapter system integrated into a vehicle in which the system allows a user to use any one of a plurality of mobile phones in a hands-free manner in the vehicle.

BRIEF DESCRIPTION OF THE DRAWINGS

The present invention is pointed out with particularity in the appended claims. However, other features of the present invention will become more apparent, and the present invention will be best understood by referring to the following detailed description in conjunction with the accompanying drawings in which:

DETAILED DESCRIPTION OF THE PREFERRED EMBODIMENT(S)

Figure 1:
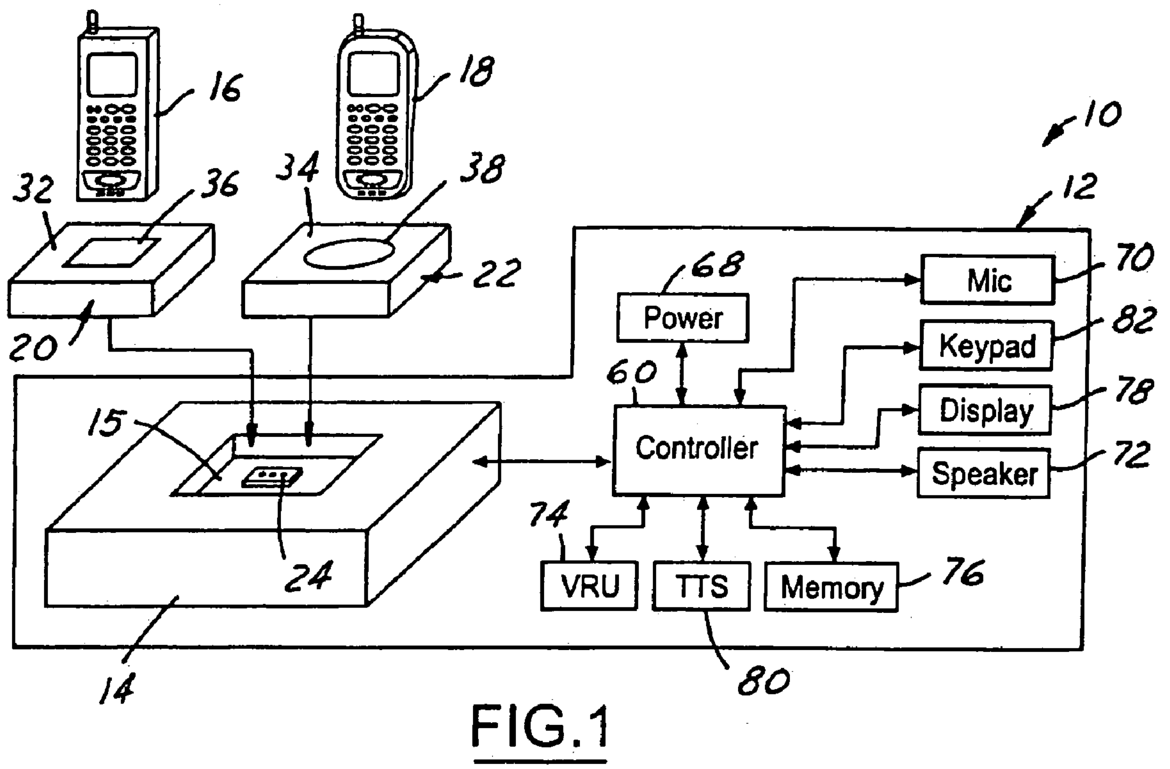
FIG. 1 illustrates a block diagram of a universal mobile phone adapter system for use in a vehicle in accordance with the present invention.

Referring now to FIG. 1, a block diagram of a universal mobile phone adapter system 10 in accordance with the present invention is shown. System 10 is for use with a vehicle (not shown) and includes a vehicle appliance 12 integrated into the vehicle. Vehicle appliance 12 includes a universal vehicle adapter base 14 that is also integrated into the vehicle. In general, system 10 allows a vehicle user such as the vehicle driver to take any one of a plurality of differently sized and configured mobile phones 16 and 18 at a time and use the selected mobile phone in a hands-free manner in the vehicle.

System 10 is for use with a corresponding vehicle of a plurality of vehicles. Thus, each vehicle has a respective system 10. Adapter bases 14 of vehicle appliances 12 are identical in size and design. The design of adapter base 14 is generally rectangular block-sized and the size of the adapter base is generally large enough to support the adapter base and components inserted therein during use of a vehicle. Each adapter base 14 serves as universal mobile phone connection point to the corresponding vehicle.

Adapter base 14 has a block-sized cavity 15 sized to removably receive one of a plurality of adapter sleeves such as adapter sleeves 20 and 22. Each adapter sleeve 20 and 22 has a block-sized design complementary to the block-sized design of cavity 15. Each adapter sleeve 20 and 22 respectively fits into cavity 15 in order to be mechanically connected to adapter base 14. Cavity 15 of adapter base 14 may receive one of adapter sleeves 20 and 22 at a time. An adapter sleeve such as adapter sleeve 20 may be removed from cavity 15 of adapter base 14 in order to allow another adapter sleeve such as adapter sleeve 22 to be inserted into the cavity of the adapter base.

Figures 2A, 2B, 2C:
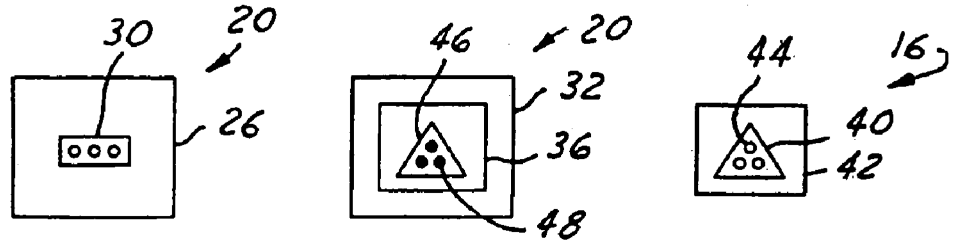
FIGS. 2A and 2B respectively illustrate plan views of the bottom and top surfaces of a first adapter sleeve for use with a first cell phone and the adapter base of the universal mobile phone adapter system.
FIG. 2C illustrates a plan view of the bottom surface of the first mobile phone.
Figures 3A, 3B, 3C:
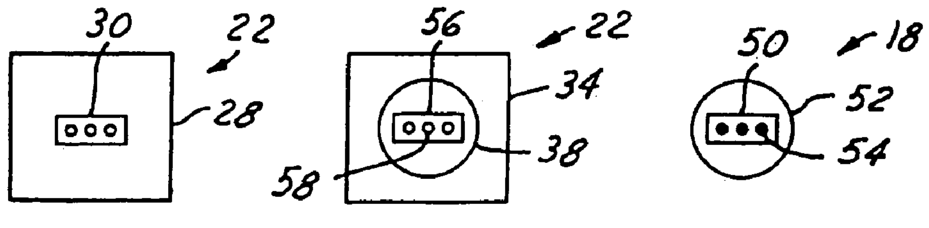
FIGS. 3A and 3B respectively illustrate plan views of the bottom and top surfaces of a second adapter sleeve for use with a second cell phone and the adapter base of the universal mobile phone adapter system.
FIG. 3C illustrates a plan view of the bottom surface of the second mobile phone.

Adapter base 14 includes an electrical plug connector 24 within cavity 15. Adapter sleeves 20 and 22 each include respective bottom surface 26 and 28 having an electrical plug connector 30 (see FIGS. 2A and 3A). Electrical plug connector 30 mates with electrical plug connector 24 of adapter base 14 when the corresponding adapter sleeve 20 or 22 is inserted into the adapter base in order to electronically connect the corresponding adapter sleeve and the adapter base.

Adapter sleeves 20 and 22 each correspond with a respective mobile phone 16 and 18. Adapter sleeves 20 and 22 are used to electrically connect the respective mobile phones 16 and 18 to adapter base 14. As such, each adapter sleeve 20 and 22 is for use with one mobile phone having a given size and a given electrical plug configuration. Adapter sleeves 20 and 22 generally transform the sizes and electrical plug configurations of mobile phones 16 and 18 to be compatible with adapter base 14. Accordingly, by way of adapter sleeves 20 and 22, a plurality of differently sized and configured mobile phones may be used with adapter base 14. Because adapter base 14 has an identical design and size with respect to the adapter bases of other vehicles, a given sized and configured mobile phone may be used with different vehicles by way of the adapter base and one of adapter sleeves 20 and 22.

Adapter sleeves 20 and 22 each include respective top surfaces 32 and 34. Top surfaces 32 and 34 each include a respective cavity 36 and 38 (also see FIGS. 2B and 3B). Cavities 36 and 38 of adapter sleeves 20 and 22 have different configurations and sizes with respect to one another. The configuration and sizes of cavities 36 and 28 of adapter sleeves 20 and 22 are different from one another in order to accommodate and removably receive differently configured and sized mobile phones 16 and 18.

For example, cavity 36 of adapter sleeve 20 has a block-sized configuration to accommodate and removably receive mobile phone 16 therein. That is, mobile phone 16 generally has a block-styled body sized to fit within cavity 36 of adapter sleeve 20. Mobile phone 16 also has an electrical plug connector 40 having, as an example, a triangular shape on a bottom surface 42 of the mobile phone (see FIG. 2C). Plug connector 40 includes, as an example, three female electrical connectors 44. Female connectors 44, when connected to corresponding connectors, are for use to generally transmit and receive phone signals, status signals, power signals, etc., between mobile phone 16 and vehicle appliance 12 via adapter sleeve 20 and adapter base 14. Correspondingly, cavity 36 of adapter sleeve 20 has a complementary electrical plug connector 46 having a triangular shape (see FIG. 2B). Plug connector 46 includes three male electrical connectors 48 for receiving the female connectors 44 of mobile phone 16.

When mobile phone 16 is inserted into cavity 36 of adapter sleeve 20 the mobile phone 16 is mechanically connected to adapter sleeve 20. Further, plug connector 40 of mobile phone 16 and plug connector 46 of adapter sleeve 20 connect with one another in order to electronically connect the mobile phone 16 and adapter sleeve 20. Plug connector 46 of adapter sleeve 20 is electronically interconnected to plug connector 30 located on bottom surface 26 of the adapter sleeve. Adapter sleeve 20 includes internal electronics which electrically interconnect plug connectors 30 and 46 such that mobile phone 16 and vehicle appliance 12 electrically communicate with one another via plug connectors 40, 46, and 30 when the mobile phone 16 is inserted into adapter sleeve 20 and the adapter sleeve 20 is inserted into adapter base 14.

Adapter sleeve 20 with mobile phone 16 inserted therein are removable from adapter base 14 as one piece. Mobile phone 16 is also removable from adapter sleeve 20 when the adapter sleeve is inserted or removed from adapter base 14. Accordingly, if desired, the user removes mobile phone 16 from adapter sleeve 20 and adapter base 14 in order to take the mobile phone out from the vehicle. When entering the vehicle, the user re-inserts mobile phone 16 into adapter sleeve 20 and inserts the adapter sleeve into adapter base 14 (if the adapter sleeve is not already inserted into the adapter base) in order to use mobile phone 16 in conjunction with system 10. If desired, instead of using the mobile phone 16 and adapter sleeve 20 combination, the user inserts the mobile phone 18 and adapter sleeve 22 into adapter base 14 combination in order to use the mobile phone 18 with system 10. Mobile phone 18 is also removable from adapter sleeve 22 when the adapter sleeve 22 is inserted or removed from adapter base 14.

As another example of the different configurations and sizes of cavities 36 and 38 of adapter sleeves 20 and 22 with respect to one another, cavity 38 of adapter sleeve 22 has a circular-sized configuration to accommodate and receive mobile phone 18 therein. That is, mobile phone 18 generally has a circular-styled body sized to fit within cavity 38 of adapter sleeve 22. Mobile phone 18 also has an electrical plug connector 50 having, as an example, a rectangular shape on a bottom surface 52 of the mobile phone (see FIG. 3C). Plug connector 50 includes, as an example, three male electrical connectors 54. Male connectors 54 are for use to generally transmit and receive phone signals, status signals, power signals, etc., between mobile phone 18 and vehicle appliance 12 via adapter sleeve 22 and adapter base 14. Correspondingly, cavity 38 of adapter sleeve 22 has a complementary electrical plug connector 56 having a rectangular shape (see FIG. 3B). Plug connector 56 includes three female electrical connectors 58 for receiving the male connectors 54 of mobile phone 18.

When mobile phone 18 is inserted into cavity 38 of adapter sleeve 22 the mobile phone 18 is mechanically connected to adapter sleeve 22. Further, plug connector 50 of mobile phone 18 and plug connector 56 of adapter sleeve 22 connect with one another in order to electronically connect the mobile phone 18 and adapter sleeve 22. Plug connector 56 of adapter sleeve 22 is electronically interconnected to plug connector 30 located on bottom surface 26 of the adapter sleeve. Adapter sleeve 22 also includes internal electronics which electrically interconnect plug connectors 30 and 56 such that mobile phone 18 and vehicle appliance 12 can electrically communicate with one another via plug connectors 50, 56, and 30 when the mobile phone 18 is inserted into adapter sleeve 22 and the adapter sleeve 22 is inserted into adapter base 14.

Accordingly, one mobile phone and adapter sleeve combination may be inserted into adapter base 14 at a time in order to electronically connect the mobile phone to vehicle appliance 12 in order to enable a user of the vehicle to use the mobile phone in a hands-free manner during a phone call. For example, the mobile phone 16 and adapter sleeve 20 combination may be inserted into adapter base 14 in order to electronically connect the mobile phone 16 to vehicle appliance 12. At another time, the mobile phone 18 and adapter sleeve 22 combination may be inserted into adapter base 14 in order to electronically connect the mobile phone 18 to vehicle appliance 12.

Mobile phone 16 (or mobile phone 18) is electronically connected to vehicle appliance 12 in order to enable hands-free use of the mobile phone 16 when a user is making a phone call. To this end, adapter base 14 is connected to a controller 60 of vehicle appliance 12. Controller 60 generally communicates with mobile phone 16 via adapter base 14 and adapter sleeve 20 and controls the overall operation of the elements of system 10. Controller 60 is connected to a vehicle power supply 68 to receive and provide power to the elements of system 10.

Vehicle appliance 12 includes a microphone 70 for receiving voice communications of the user. Microphone 70 is connected to controller 60 and is positioned within the vehicle to be near to the user. For instance, microphone 70 is positioned on the rear view mirror to be near the front vehicle passengers. As such, in order to talk on mobile phone 16 the user talks into microphone 70 instead of talking into the microphone of mobile phone 16 which is supported in adapter base 14. Microphone 70 transfers the user's voice communications to controller 60. In turn, controller 60 transfers the voice communications to mobile phone 16 via adapter base 14 and adapter sleeve 20 for transmission to the telephone of the party with whom the user is communicating during the phone call.

Vehicle appliance 12 includes a speaker 72 such as one of the vehicle's radio speakers. Speaker 72 is also connected to controller 60. Controller 60 controls speaker 72 to output the other party's voice communications received by mobile phone 16 during the phone call between the other party and the user. That is, controller 60 receives the other party's voice communications from mobile phone 16 via adapter base 14 and adapter sleeve 20 and then transfers these voice communications to speaker 72 for the user to hear. As such, the user hears the other party's voice communications by way of speaker 72 instead of listening to the speaker of mobile phone 16.

Vehicle appliance 12 includes a voice recognition module (VRU) 74 connected to controller 60. VRU 74 is operable to translate user's voice commands received by microphone 70 into signals which are useable by controller 60. For example, VRU 74 translates the user's voice command "dial" into a corresponding command signal for use by controller 60. Similarly, VRU 74 translates numeric characters spoken by the user into corresponding signals for controller 60. In response to such voice commands, controller 60 controls the operation of mobile phone 16 accordingly.

Vehicle appliance 12 includes memory 76 connected to controller 60. Memory 76 generally stores telephone number information in a phonebook directory like a phonebook directory of mobile phone 16. Such information may include a listing of names and associated telephone numbers. Controller 60 accesses memory 76 and the memory of mobile phone 16 to obtain such information and to write such information to the both memories.

Vehicle appliance 12 includes a display 78 for displaying information to the user. Controller 60 controls display 78 to display the same type of information which is displayed on mobile phone 16 when the mobile phone 16 is in use while connected to adapter base 14.

Controller 60 includes a voice synthesizer (not shown) which generates electronic voice signals in response to corresponding electrical signals generated by the controller during operation of system 10. The voice synthesizer is connected to speaker 72 in order to output voice signals for the user to hear. For example, such outputted electronic voice signals may be "Dialing Phil" when mobile phone 16 is dialing Phil's telephone number. Vehicle appliance 12 also includes a text-to-speech (TTS) module 80. Controller 60 controls TTS module 80 to convert text messages received by mobile phone 16 into speech for output over speaker 72 with the use of the voice synthesizer.

Vehicle appliance 12 includes a keypad 82 (i.e., dialing pad) which is connected to controller 60. Keypad 82 is positioned in the vehicle to be accessible and within reach of the user. For instance, keypad 82 is positioned in the dashboard of the vehicle. Keypad 82 generally includes typical mobile phone buttons such as a numerical set of keys and the like and is generally functional to recognize dialing activity. As such, the user dials a telephone number using keypad 82 instead of manipulating the buttons of mobile phone 16 in order to make a phone call. In turn, controller 60 recognizes the dialing activity on keypad 82 and instructs mobile phone 16 to function accordingly. Controller 60 also controls display 78 to display the dialing activity (e.g., dialed numbers) of keypad 82 for the user to see.

Figure 4:
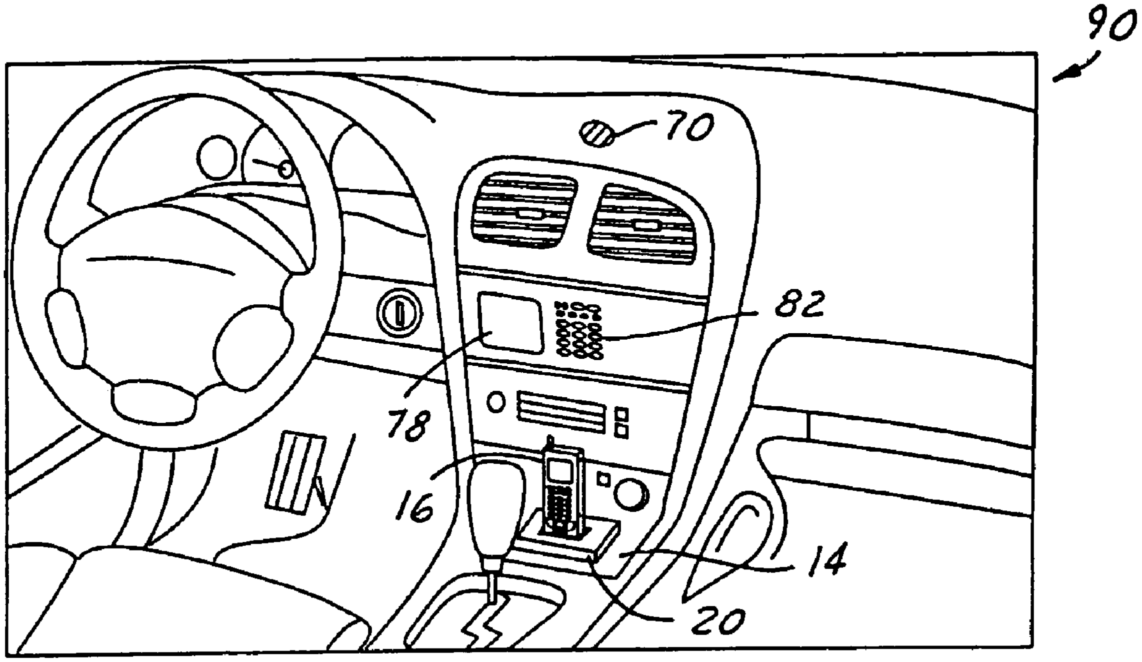
FIG. 4 illustrates a vehicle interior having a sample vehicle installation point of the adapter base of the universal mobile phone adapter system.

Referring now to FIG. 4, a vehicle interior 90 having a sample vehicle installation point of adapter base 14 is shown. Vehicle interior 90 is an example of where adapter base 14 as well as microphone 70, display 78, and keypad 82 are positioned within the interior of the vehicle for access by the user.

Thus, it is apparent that there has been provided, in accordance with the present invention, a universal mobile phone adapter method and system for vehicles that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicular hands-free mobile phone system, the system comprising:

a vehicle appliance integrated into the vehicle, the vehicle appliance being operable for enabling a user to talk hands-free on a mobile phone during a phone call between the mobile phone and a telephone of another party when the mobile phone is electronically connected to the vehicle appliance, the vehicle appliance having a universal vehicle adapter base integrated in the interior of the vehicle for access by the user, the adapter base having an adapter sleeve receiving area; and first and second adapter sleeves each being removably received within the adapter sleeve receiving area of the adapter base one at a time, the first adapter sleeve having a first mobile phone receiving area for removably receiving a first mobile phone having a first configuration, the second adapter sleeve having a second mobile phone receiving area different than the first mobile phone receiving area for removably receiving a second mobile phone having a second configuration different than the first configuration;

wherein the first adapter sleeve and the adapter base electronically connect the first mobile phone to the vehicle appliance when the first adapter sleeve receives the first mobile phone and the adapter base receives the first adapter sleeve;

wherein the second adapter sleeve and the adapter base electronically connect the second mobile phone to the vehicle appliance when the second adapter sleeve receives the second mobile phone and the adapter base receives the second adapter sleeve.

2. The system of claim 1 wherein:

the vehicle appliance includes a microphone for receiving voice communications of the user during a phone call between one of the first and second mobile phones and a telephone of another party when the one of the first and second mobile phones is electronically connected to the vehicle appliance, wherein the vehicle appliance electronically communicates the received voice communications to the one of the first and second mobile phones for transmission to the telephone of the other party during the phone call.

3. The system of claim 2 wherein:

the one of the first and second mobile phones electronically communicates voice communications received from the telephone of the other party during the phone call to the vehicle appliance when the one of the first and second mobile phones is electronically connected to the vehicle appliance, wherein the vehicle appliance is connected to a vehicle speaker for outputting the received voice communications of the other party for the user to hear during the phone call.

4. The system of claim 1 wherein:

the vehicle appliance includes a keypad, the keypad being integrated into the vehicle for access by the user, wherein the vehicle appliance controls one of the first and second mobile phones in accordance with dialing activity of the keypad when the one of the first and second mobile phones is electronically connected to the vehicle appliance.

5. The system of claim 1 wherein:

the vehicle appliance includes a display, the display being integrated into the vehicle for access by the user, wherein the vehicle appliance controls the display to display information indicative of activity of one of the first and second mobile phones when the one of the first and second mobile phones is electronically connected to the vehicle appliance.

6. The system of claim 1 wherein:

the vehicle appliance is electronically connected to a vehicle power supply in order to power one of the first and second mobile phones when the one of the first and second mobile phones is electronically connected to the vehicle appliance.

7. The system of claim 2 wherein:

the vehicle appliance includes a voice recognition converter, wherein the voice recognition converter recognizes user voice commands received by the microphone and the vehicle appliance electronically communicates with the one of the first and second mobile phones in order to control the one of the first and second mobile phones in accordance with the user voice commands when the one of the first and second mobile phones is electronically connected to the vehicle appliance.

8. The system of claim 3 wherein:

the one of the first and second mobile phones electronically communicates textual messages received from the telephone of the other party during the phone call to the vehicle appliance when the one of the first and second mobile phones is electronically connected to the vehicle appliance, wherein the vehicle appliance includes a text-to-speech (TTS) converter which converts the received textual messages into speech, wherein the vehicle appliance outputs the speech on the speaker for the user to hear during the phone call.

9. The system of claim 1 wherein:

the adapter sleeve receiving area of the adapter base has a universal electrical plug connector, and the first and second adapter sleeves each have a complementary universal electrical plug connector;

wherein the plug connector of the adapter base and the complementary plug connector of the first adapter sleeve interconnect with one another in order to electronically connect the first adapter sleeve to the vehicle appliance when the adapter base receives the first adapter sleeve;

wherein the plug connector of the adapter base and the complementary plug connector of the second adapter sleeve interconnect with one another in order to electronically connect the second adapter sleeve to the vehicle appliance when the adapter base receives the second adapter sleeve.

10. The system of claim 9 wherein:

the first adapter sleeve has a first electrical plug connector which connects with a complementary electrical plug connector of the first mobile phone when the first adapter sleeve receives the first mobile phone in order to electronically connect the first mobile phone to the first adapter sleeve and thereby electronically connect the first mobile phone to the vehicle appliance when the adapter base receives the first adapter sleeve.

11. The system of claim 10 wherein:

the second adapter sleeve has a second electrical plug connector different than the first electrical plug connector of the first adapter sleeve, the second electrical plug connector connects with a complementary electrical plug connector of the second mobile phone when the second adapter sleeve receives the second mobile phone in order to electronically connect the second mobile phone to the second adapter sleeve and thereby electronically connect the second mobile phone to the vehicle appliance when the adapter base receives the second adapter sleeve.

12. A universal mobile phone adapter device for a vehicular hands-free mobile phone system, the system having a vehicle appliance integrated into a vehicle, the vehicle appliance being operable for enabling a user to talk hands-free on a mobile phone during a phone call between the mobile phone and a telephone of another party when the mobile phone is electronically connected to the vehicle appliance, the device comprising:

a universal vehicle adapter base integrated in the interior of the vehicle for access by the user, the adapter base being electronically connected to the vehicle appliance and having an adapter sleeve receiving area sized to receive at a time one adapter sleeve having a uniform base configuration;

a first adapter sleeve having the uniform base configuration in order to be removably receivable within the adapter sleeve receiving area of the adapter base, the first adapter sleeve having a first mobile phone receiving area for removably receiving a first mobile phone having a first physical body configuration and a first electrical interface configuration;

wherein the first adapter sleeve and the adapter base electronically connect the first mobile phone to the vehicle appliance when the first adapter sleeve receives the first mobile phone and the adapter base receives the first adapter sleeve;

a second adapter sleeve having the uniform base configuration in order to be removably receivable within the adapter sleeve receiving area of the adapter base, the second adapter sleeve having a second mobile phone receiving area different than the first mobile phone receiving area for removably receiving a second mobile phone having a second physical body configuration and a second electrical interface configuration different than the first physical body configuration and the first electrical interface configuration;

wherein the second adapter sleeve and the adapter base electronically connect the second mobile phone to the vehicle appliance when the second adapter sleeve receives the second mobile phone and the adapter base receives the second adapter sleeve.

13. The device of claim 12 wherein the vehicle appliance includes a microphone for receiving voice communications of the user during a phone call between one of the first and second mobile phones and a telephone of another party when the one of the first and second mobile phones is electronically connected to the vehicle appliance, wherein:

the one of the first and second mobile phones electronically receives the voice communications from the vehicle appliance for transmission to the telephone of the other party during the phone call when the one of the first and second mobile phones is electronically connected to the vehicle appliance.

14. The device of claim 13 wherein the vehicle appliance is connected to a vehicle speaker for outputting voice communications of the other party for the user to hear during the phone call, wherein:

the one of the first and second mobile phones electronically transmits voice communications of the other party received from the telephone of the other party during the phone call to the vehicle appliance when the one of the first and second mobile phones is electronically connected to the vehicle appliance for the vehicle appliance to output over the vehicle speaker.

15. The device of claim 12 wherein the vehicle appliance includes a keypad integrated into the vehicle for access by the user, wherein:

the one of the first and second mobile phones electronically receives commands indicative of dialing activity on the keypad from the vehicle appliance and functions in accordance with the received commands when the one of the first and second mobile phones is electronically connected to the vehicle appliance.

16. The device of claim 12 wherein the vehicle appliance includes a display integrated into the vehicle for access by the user, wherein:

the one of the first and second mobile phones electronically transmits display information indicative of mobile phone activity to the vehicle appliance for the vehicle appliance to display on the display when the one of the first and second mobile phones is electronically connected to the vehicle appliance.

17. The device of claim 12 wherein:

the adapter sleeve receiving area of the adapter base has a universal electrical plug connector, and the first and second adapter sleeves each have a complementary universal electrical plug connector;

wherein the plug connector of the adapter base and the complementary plug connector of the first adapter sleeve interconnect with one another in order to electronically connect the first adapter sleeve to the vehicle appliance when the adapter base receives the first adapter sleeve;

wherein the plug connector of the adapter base and the complementary plug connector of the second adapter sleeve interconnect with one another in order to electronically connect the second adapter sleeve to the vehicle appliance when the adapter base receives the second adapter sleeve.

18. The device of claim 17 wherein:

the first adapter sleeve has a first electrical plug connector which connects with a complementary electrical plug connector of the first mobile phone when the first adapter sleeve receives the first mobile phone in order to electronically connect the first mobile phone to the first adapter sleeve and thereby electronically connect the first mobile phone to the vehicle appliance when the adapter base receives the first adapter sleeve;

wherein the second adapter sleeve has a second electrical plug connector different than the first electrical plug connector of the first adapter sleeve, the second electrical plug connector connects with a complementary electrical plug connector of the second mobile phone when the second adapter sleeve receives the second mobile phone in order to electronically connect the second mobile phone to the second adapter sleeve and thereby electronically connect the second mobile phone to the vehicle appliance when the adapter base receives the second adapter sleeve.

19. A method for using a vehicle appliance operable for enabling a user to talk hands-free on a mobile phone during a phone call between the mobile phone and a telephone of another party when the mobile phone is electronically connected to the vehicle appliance, the vehicle appliance having a universal mobile phone adapter base in the interior of the vehicle for access by a user, the adapter base having an adapter sleeve receiving area for receiving an adapter sleeve at a time, the method comprising:

inserting a first adapter sleeve having a first mobile phone receiving area into the adapter sleeve receiving area of the adapter base in order to electronically connect the first adapter sleeve to the vehicle appliance;

inserting a first mobile phone having a first configuration into the first mobile phone receiving area of the first adapter sleeve in order to electronically connect the first mobile phone to the first adapter sleeve such that the first mobile phone is electronically connected to the vehicle appliance when the first mobile phone is inserted into the first adapter sleeve and the first adapter sleeve is inserted into the adapter base;

removing the first adapter sleeve from the adapter base;

inserting a second adapter sleeve having a second mobile phone receiving area different than the first mobile phone receiving area into the adapter base in order to electronically connect the second adapter sleeve to the vehicle appliance;

inserting a second mobile phone having a second configuration different than the first configuration into the second mobile phone receiving area of the second adapter sleeve in order to electronically connect the second mobile phone to the second adapter sleeve such that the second mobile phone is electronically connected to the vehicle appliance when the second mobile phone is inserted into the second adapter sleeve and the second adapter sleeve is inserted into the adapter base.

20. The method of claim 19 further comprising:

removing the first mobile phone from the first adapter sleeve after the first mobile phone has been inserted into the first adapter sleeve.

* * * * *